Aug. 17, 1954  C. O. J. MONTELIUS  2,686,534
NONCHATTERING RELIEF VALVE
Filed Sept. 27, 1950
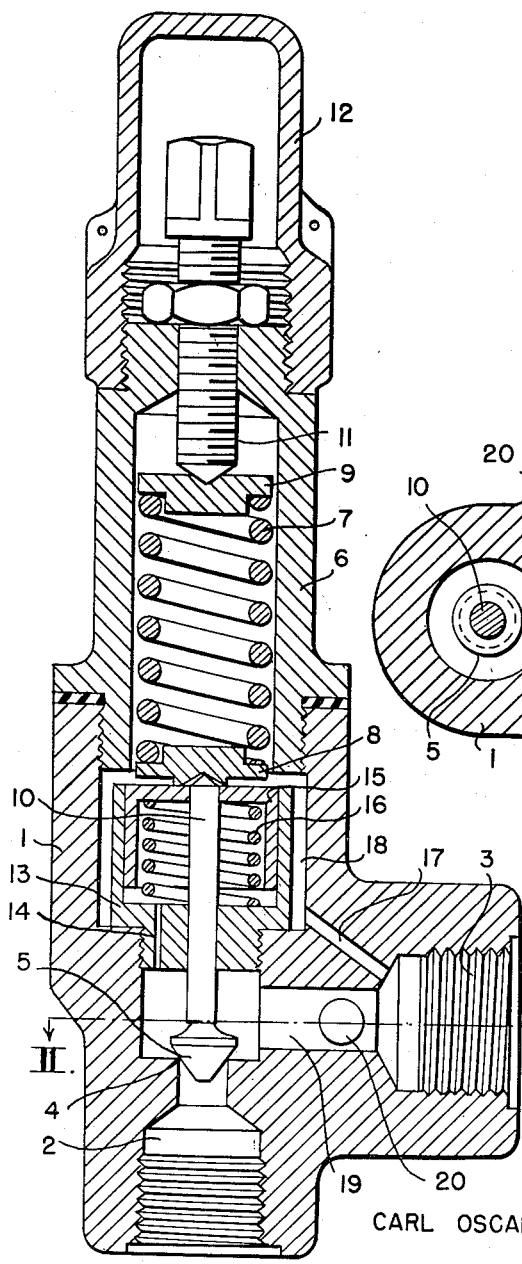
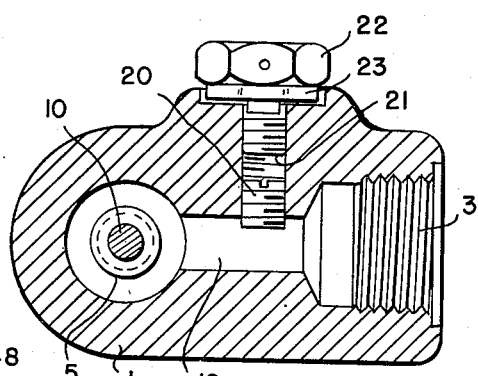
INVENTOR.
CARL OSCAR JOSEF MONTELIUS
BY
Basser + Harding
ATTORNEYS Patented Aug. 17, 1954

2,686,534

UNITED STATES PATENT OFFICE 2,686,534

NONCHATTERING RELIEF VALVE

Carl Oscar Josef Montelius, Stockholm, Sweden

Application September 27, 1950, Serial No. 186,977

2 Claims. (Cl. 137—514)

This invention relates to improvements in such safety and by-pass valves in which a valve body in its closed position is pressed against a seat by means of a spring or like member.

Such valves, of which there are various constructions, begin opening at a certain predetermined overpressure, but most types involve the disadvantage of the opening pressure changing with the quantity of the medium flowing through, at the same time being apt to oscillate, thus causing noise and knocking, and should damping pistons be used to prevent this, their opening speed will instead be so reduced that the valve will only open up slowly at sudden rises of the pressure.

The object of the present invention is to remove this disadvantage and this is substantially carried into effect by a damping piston being subjected to the action of a second spring, weaker than the first mentioned spring, said second spring being adapted to counter-act and damp the closing motion of the valve body without delaying its opening motion.

The arrangement of this damping piston may be such that opposite sides of the damping piston are connected with the passage of flow at different points so that the piston is actuated by the difference in pressure by the flow of the medium. The damping piston is preferably located at the delivery side of the valve, but separated from the delivery chamber by a wall provided with one or more narrow passages.

For a better understanding of the nature of the invention and to show how it may be carried into effect, the same will now be described with reference to the accompanying drawing wherein:

Fig. 1 shows the valve in longitudinal section, while Fig. 2 is a cross-section along the line II—II in Fig. 1.

1 is the valve housing proper, having an inlet 2 and an outlet 3. 4 is the valve seat and 5 the valve body. A tubular sleeve part 6 is screwed to the upper part of the valve housing. In this sleeve part there is a spring 7 actuating the valve body 5. Said spring is mounted between two washers 8 and 9, the former engaging the spindle end 10 of the valve body 5, and the latter being subjected to the action of a threaded adjustment stud 11, screwed into the upper part 6, the head of said stud being enclosed in a safety cap 12 screwed to said sleeve part.

At the delivery side of the valve housing, below the spring 7, is mounted a sleeve-shaped cylindrical chamber 13, an end surface of which engages an annular abutment in the valve housing. Through an aperture in the bottom of said chamber the spindle 10 of the valve body 5 extends to engagement with the washer 8. Inside the chamber 13, which by means of one or more narrow passages 14 communicates with the interior of the valve housing immediately above the valve body, there is a movable piston 15 having a slight clearance and slidably mounted on the valve spindle, said piston being subjected to the action of a spring 16, weaker than the spring 7 and tending to press the piston to engagement with the washer 8.

When the valve body is subjected to a lifting force greater than the force acting on the washer 8, the valve body will rise and the medium will begin to flow out to be discharged through the outlet 3. The medium will then also be supplied to the chamber 13 through the passage 14, so as to actuate the piston 15 in the same direction as the spring 16. At the same time the medium from the outlet 3 will act on the opposite face of the piston 15 with a certain pressure through a passage 17 and a clearance 18 between the valve housing and the chamber 13, said latter pressure being lower due to the flow of the medium.

When the valve tends to move towards the seat by the action of the spring 7 during the period when the medium is flowing through the valve, this motion is opposed by both the spring 16 and the just mentioned pressure on the piston 15. Moreover the piston 15, due to the narrow passage 14, will to a certain extent act as a dashpot.

As it has been proved that just the difference in pressure at the upper and lower face of the piston 15 is of great importance for the operation of the valve and that the adjustment of this difference within certain limits involves substantial advantages, choking means are located immediately in the front of the outlet 3 and the passage 17, said choking means being in the form of a threaded stud 20 screwed into the threaded boring 21. This stud will permit a suitably adapted difference of pressure when being more or less screwed into the passage portion 19. The threaded boring 21 is closed by a threaded stud 22, between the head of which and the valve housing 1 a tightening washer 23 is placed.

At a sudden rise of pressure the valve 5 can open rapidly without the piston 15 having to follow immediately. Such vibrations, which would otherwise occur in some cases are prevented by the piston 15 being raised and being pressed against the washer 8 by the spring 16. An increase in pressure in the inlet 2 is avoided on account of a difference in pressure, due to the flow of the liquid arising between the pressure in the delivery chamber located around the valve 5 and the space below the piston 15 communicating therewith through the narrow passage 14 on the one hand and the pressure in the outlet 3 and the space above the piston 15 communicating therewith through the passage 17 on the other hand.

The under and upper side of the piston will thus be subjected to different pressures causing the spring load on the valve 5 to vary. This will occur in such a direction that a rise in pressure in the inlet is counterbalanced. The difference in pressure can moreover be controlled by adjusting the screw 20, whereas when the pressure in the inlet 2 falls and the valve 5 closes, a too rapid closing of the valve 5 is avoided by the motion of the piston 15 being damped, owing to the liquid below the piston having to flow out through the narrow passage 14.

Having now particularly described the nature of my invention and the manner of its operation what I claim is:

1. A relief valve comprising a valve casing including an inlet port, an outlet port, a passage extending through the valve between said inlet and said outlet ports and a valve seat in the wall surrounding said passage, a movable valve member adapted to engage said seat, a main spring positioned to urge said valve member into engagement with said valve seat, said valve member being adapted to be raised from said valve seat by the pressure of fluid in said inlet port acting thereon against the action of said main spring, a damping piston, means providing a chamber housing said piston and extending longitudinally of said valve member, said damping piston being movable in the chamber independently of said valve member and positioned to be urged toward said valve seat by said main spring, a second spring weaker than said main spring urging said damping piston against the action of said main spring, a first passage providing communication between the side of said piston away from said main spring and said valve passage on the downstream side of said valve seat, a second passage providing communication between the side of said piston toward said main spring and said valve passage on the downstream side of said first passage, the fluid pressure drop in said valve passage between said first and second passages providing a difference in the pressures of the fluid acting upon opposite sides of said piston, said piston being urged against the action of said main spring by the difference in pressures of the fluid on opposite sides of said piston when fluid flow exists through said valve passage, and closing of said valve member by said main spring being delayed by the resistance to displacement of the fluid under said piston afforded by said first passage.

2. A relief valve comprising a valve casing including an inlet port, an outlet port, a passage extending through the valve between said inlet and said outlet ports and a valve seat in the wall surrounding said passage, a movable valve member adapted to engage said seat, a main spring positioned to urge said valve member into engagement with said valve seat, said valve member being adapted to be raised from said valve seat by the pressure of fluid in said inlet port acting thereon against the action of said main spring, a damping piston, means providing a chamber housing said piston and extending longitudinally of said valve member, said damping piston being movable in the chamber independently of said valve member and positioned to be urged toward said valve seat by said main spring, a second spring weaker than said main spring urging said damping piston against the action of said main spring, a first passage providing communication between the side of said piston away from said main spring and said valve passage on the downstream side of said valve seat, a second passage providing communication between the side of said piston toward said main spring and said valve passage on the downstream side of said first passage, and an adjustable restriction in said valve passage between said first and second passages for regulating the difference in the pressures of the fluid acting upon opposite sides of said piston, said piston being urged against the action of said main spring by the difference in pressures of the fluid on opposite sides of said piston when fluid flow exists through said valve passage, and closing of said valve member by said main spring being delayed by the resistance to displacement of the fluid under said piston afforded by said first passage.

References Cited in the file of this patent

UNITED STATES PATENTS

| Number | Name | Date |
|---|---|---|
| 1,846,483 | Gilbert | Feb. 23, 1932 |
| 1,884,179 | Parks | Oct. 25, 1932 |
| 1,962,549 | Bjorklund | June 12, 1934 |
| 2,002,451 | Gray | May 21, 1935 |
| 2,150,266 | Cotner | Mar. 14, 1939 |
| 2,170,478 | Long et al. | Aug. 22, 1939 |
| 2,583,295 | Greer et al. | Jan. 22, 1952 |

FOREIGN PATENTS

| Number | Country | Date |
|---|---|---|
| 166,688 | Germany | Jan. 8, 1906 |
| 251,978 | Switzerland | Sept. 1, 1948 |